United States Patent [19]

Mohan et al.

[11] Patent Number: 4,576,262

[45] Date of Patent: Mar. 18, 1986

[54] METHOD AND APPARATUS FOR OPERATING A MAGNETIC CLUTCH

[75] Inventors: William L. Mohan; Samuel P. Willits, both of Barrington, Ill.

[73] Assignee: Spartanics Ltd., Rolling Meadows, Ill.

[21] Appl. No.: 565,990

[22] Filed: Dec. 27, 1983

[51] Int. Cl.⁴ .............................................. F16D 67/06
[52] U.S. Cl. ................................ 192/18 B; 192/144; 361/167; 361/245
[58] Field of Search .................... 192/144, 12 D, 18 B, 192/17 C, 21.5, 3.56, 143; 361/245, 246, 152, 191, 167

[56] References Cited

U.S. PATENT DOCUMENTS 2,806,967  9/1957  Eck et al. ......................... 192/12 D
4,449,619  5/1984  Sakakiyama ...................... 192/21.5

Primary Examiner—George H. Krizmanich
Attorney, Agent, or Firm—Thomas R. Vigil

[57] ABSTRACT

The method and apparatus are used for operating a magnetic clutch system of the type which includes a magnetic clutch having a clutch magnetizing coil which can be actuated to couple a first rotatable element to a second rotatable element when voltage is applied across the clutch magnetizing coil and which disengages the second rotatable member when voltage is disconnected from, or connected in reverse polarity across, the clutch magnetizing coil and which can include a brake with a brake magnetizing coil.

The method includes the steps of and the apparatus includes means for: applying a voltage from a high voltage DC voltage source across an inductor coil, such as a brake magnetizing coil, for a first time period, applying a voltage from the voltage source across the clutch magnetizing coil for a first time period with both of the coils being connected in parallel across the voltage source, providing a unidirectional current path across the coils, simultaneously and momentarily disconnecting the voltage across both coils causing the coils to reverse polarity with the current generated in each coil flowing through the unidirectional current path, reconnecting the clutch magnetizing coil in series with the inductor coil across the voltage source but with the clutch magnetizing coil connected in reverse polarity to the first connection thereof across the voltage source for a second period of time thereby to accelerate a rapid change of magnetic polarity of the clutch magnetizing coil to repel a flywheel coupling disc of the magnetic clutch, and after the second time period, again disconnecting the coils from the voltage source.

12 Claims, 4 Drawing Figures

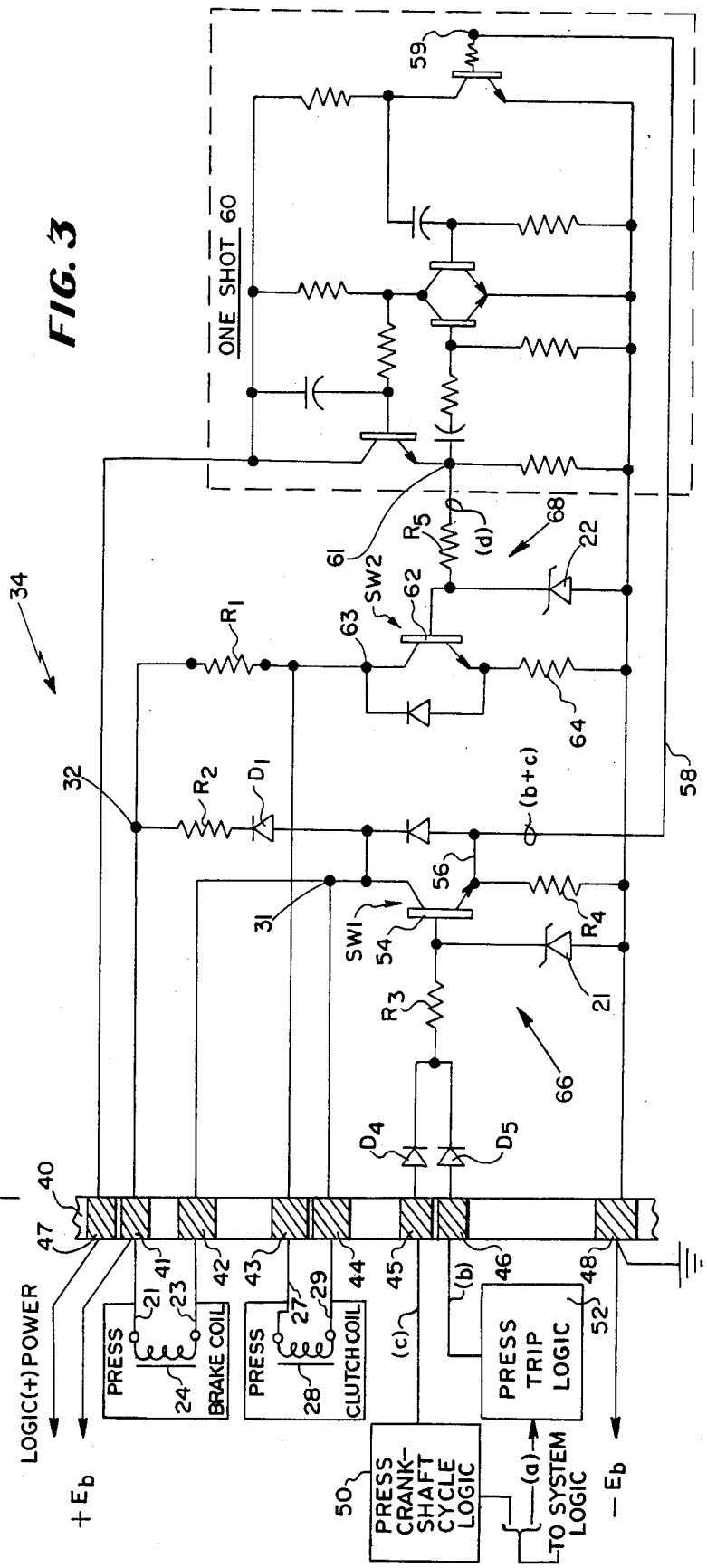

METHOD AND APPARATUS FOR OPERATING A MAGNETIC CLUTCH

BACKGROUND OF THE INVENTION

1. Field of the Invention

The present invention relates to a method and apparatus for operating a magnetic clutch. More specifically, the present invention relates to a control circuit for effecting fast and positive uncoupling of a magnetic clutch.

2. Description of the Prior Art

Heretofore the productivity of machine tools has been greatly influenced by the rotational speed at which the machine tool can operate.

More particularly, punch presses, shears and other single cycle operating devices utilizing a mechanical pin clutch in combination with friction brakes have their cyclic rate determined by the rotational speed of a prime mover, the time delays in engaging a ram clutch pin to the prime mover and the time it takes to disengage the prime mover and stop the ram. Here the rotational rate or speed is limited primarily by engagement shock inherent with the mechanical clutch.

With the developement of sophisticated electronic and electro-optical control circuits and in particular electro-optical single and dual axis correctors to automatically sense and position a registration mark in a machine for punching, drilling, shearing or performing whatever machining requirements are desired, it becomes advantageous to maximize the productivity of the machine tool by shortening or eliminating all unnecessary system delays.

In such sophisticated systems, electrical clutches and brakes have been used instead of mechanical clutches. Such electrical clutches and brakes rely upon magnetically activated ferromagnetic members to couple a mechanical power transmission element to a driven element.

In a typical electromagnetic clutch, a revolving ferromagnetic disc is coupled by magnetic attraction to another ferromagnetic disc on a shaft to cause it to rotate. Usually the electromagnet producing the coupling magnetic flux is stationary and the flux passes through an air gap through a rotation rotor and into a coupling disc.

Several time delays are associated with an electromagnetic coupling device and the operation thereof. These delays can be summarized as follows:

1. The delay of flux buildup upon application of power to a clutch coil.
2. The delay of mechanically moving the coupling disc members for engagement after flux buildup.
3. The delay of flux decay upon removing power from the clutch coil.
4. The drop out of the coupling disc members after the flux decay.

The first delay is determined by the L/R charging circuit characteristics where L is the inductance and R is the resistance of the clutch magnetizing coil. This delay can be minimized by providing conventional hi-impedance, hi-voltage driving circuits.

The second delay is a function of the magnetic gap-disc inertia and the applied magneto-motive force (mmf). Usually this delay is minimal and can be influenced by the circuit used to energize the clutch magnetizing coil.

The third delay is influenced by the L/R discharge circuit characteristics, but more important is the residual magnetism associated with all the ferromagnetic material due primarily to the magnetic hysteresis characteristics associated with the material.

The fourth delay is a function of the force available to separate the coupling disc members.

It is to be understood that if a demagnetized sample of ferromagnetic material is subjected to a steadily increasing value of H (Magnetic Field Intensity), a maximum value of H is reached where the material is essentially saturated. If the magnetic field intensity H is then decreased to zero, the flux drops down on a curve of B vs H (Magnetic Induction in gauss' vs Magnetic Field Intensity in oersteds) that is different than the curve it rises on. If the current is reversed, the same will occur in the negative direction. This results in two spaced apart S-shaped curves meeting at their positive and negative ends so as to form a loop which is referred to as a hysteresis loop.

A ferromagnetic substance is capable of having an infinity of different hysteresis loops depending only on the maximum value of H reached on the rising characteristics before H is decreased.

The maximum value of H and of the B-H hysteresis characteristics are defined by the power requirements of the system.

In any event, the delay associated with the residual magnetism is the most important delay. From observations of the hysteresis loop, the residual magnetism can be brought to zero quicker to release the coupling magnetism sooner if the power to the magnetic coil first reverses at the time decoupling is required.

Heretofore, various methods and apparatus have been proposed for accomplishing the reversing effect. Examples of such previous proposals for reversing the magnetic effect are disclosed in the following patents:

| U.S. PAT. NO. | PATENTEE |
|---|---|
| 2,615,945 | Jaeschke |
| 4,306,268 | Cooper |

The Jaeschke U.S. Pat. No. 2,615,945 discloses a system for demagnetizing a fluid magnetic gap material utilizing a mechanically operated switch to discharge a capacitor in the reverse direction of the original magnetization to decrease the release time.

More specifically, in this system a DC current is simultaneously applied to a capacitor and to a field coil of an electromagnetic coupling. At the same time as the field coil is being energized from the voltage source, a resistor network coupled in series between the voltage source and the field coil is sequentially switched from a high resistance to a low resistance. Then, when it is desired to decouple the electromagnetic coupling, the voltage source across the coil is disconnected from the field coil and the capacitor is connected in reverse polarity across the field coil in a closed loop circuit arrangement.

The Cooper U.S. Pat. No. 4,306,268 discloses a complex switching system for shortening the time delay of demagnetization of a large lifting magnet to provide better accuracy of drop upon release of the magnet.

More specifically, the system provides an electromagnet having a coil which is energized with voltage at one polarity for picking up magnetizable pieces of material. Then, when it is desired to repel or drop those pieces of material from the electromagnet, the coil of the electromagnet is first connected in a closed loop dissipating circuit having impedance means therein for dissipating stored energy, and after the voltage across the coil of the electromagnet drops to the potential of the voltage source, the voltage source is connected in reverse polarity across the coil of the electromagnet to assist in the rapid change of magnetic polarity of the electromagnet to repel magnetized particles that adhere thereto.

As will be described in greater detail hereinafter, the method and apparatus of the present invention differ from the previously proposed control circuits by providing an inductor(preferably realized by a brake magnetizing coil) that is continuously energized while the magnetic polarity of a clutch magnetizing coil is reversed. By using the inductor or brake magnetizing coil in the method and apparatus, the current through the clutch magnetizing coil is very accurately controlled to provide predictable operating and release times thereby substantially reducing the "per cycle" time of operation.

SUMMARY OF THE INVENTION

According to the invention there is provided a method for operating a magnetic clutch system of the type which includes a magnetic clutch having a clutch magnetizing coil which can be actuated to couple a first rotatable element to a second rotatable element when voltage having one polarity is applied across the clutch magnetizing coil and which disengages the second rotatable member when voltage is disconnected from, or momentarily connected in reverse polarity across, the clutch magnetizing coil, said method including the steps of: providing a DC voltage source, applying a voltage from said voltage source having a given polarity across an inductor coil for a first time period, applying a voltage from said voltage source having one polarity across the clutch magnetizing coil for a first time period with both of said coils being connected in parallel across said voltage source, providing a unidirectional current path across said coils, simultaneously and momentarily disconnecting the voltage across both coils causing the coil voltages to reverse polarity with the sum of the current flowing in each coil flowing through said unidirectional current path, reconnecting the clutch magnetizing coil in series with the inductor coil across said voltage source but with said clutch magnetizing coil connected in reverse polarity to the first connection thereof across said voltage source for a second time period thereby to force a rapid change of magnetic polarity of the clutch magnetizing coil to repel a flywheel coupling disc of the magnetic clutch, and after the second time period, again disconnecting the coils from said voltage source.

Further according to the invention there is provided an apparatus for operating a magnetic clutch system of the type which includes a magnetic clutch having a clutch magnetizing coil which can be actuated to couple a first rotatable element to a second rotatable element when voltage having one polarity is applied across the clutch magnetizing coil and which disengages the second rotatable member when voltage is disconnected from, or momentarily connected in reverse polarity across the clutch magnetizing coil, said apparatus including: a DC voltage source, an inductor coil, first circuit means for coupling a voltage from said voltage source having a given polarity across said inductor coil for a first time period, second circuit means for coupling a voltage from said voltage source having one polarity across said clutch magnetizing coil for a first time period with both of said coils being connected in parallel across said voltage source, a unidirectional current path coupled across said coils, first switch means for simultaneously and momentarily disconnecting the voltage across both coils causing said coils to reverse polarity with the current generated in each coil flowing through said unidirectional current path, second switch means for reconnecting said clutch magnetizing coil in series with said inductor coil across said voltage source but with said clutch magnetizing coil connected in reverse polarity to the first connection thereof across said voltage source for a second time period thereby to force a rapid change of magnetic polarity of said clutch magnetizing coil to repel a flywheel coupling disc of said magnetic clutch while maintaining said inductor coil energized, and means for operating said second switch means to disconnect said coils from said voltage source after the second time period.

BRIEF DESCRIPTION OF THE DRAWINGS

FIG. 3 is a detailed schematic circuit diagram of one preferred embodiment of the apparatus of the present invention.

FIG. 4 is a graph of voltage vs. time for the signal values at four different points in the circuit shown in FIG. 3.

DESCRIPTION OF THE PREFERRED EMBODIMENTS

Figure 1:
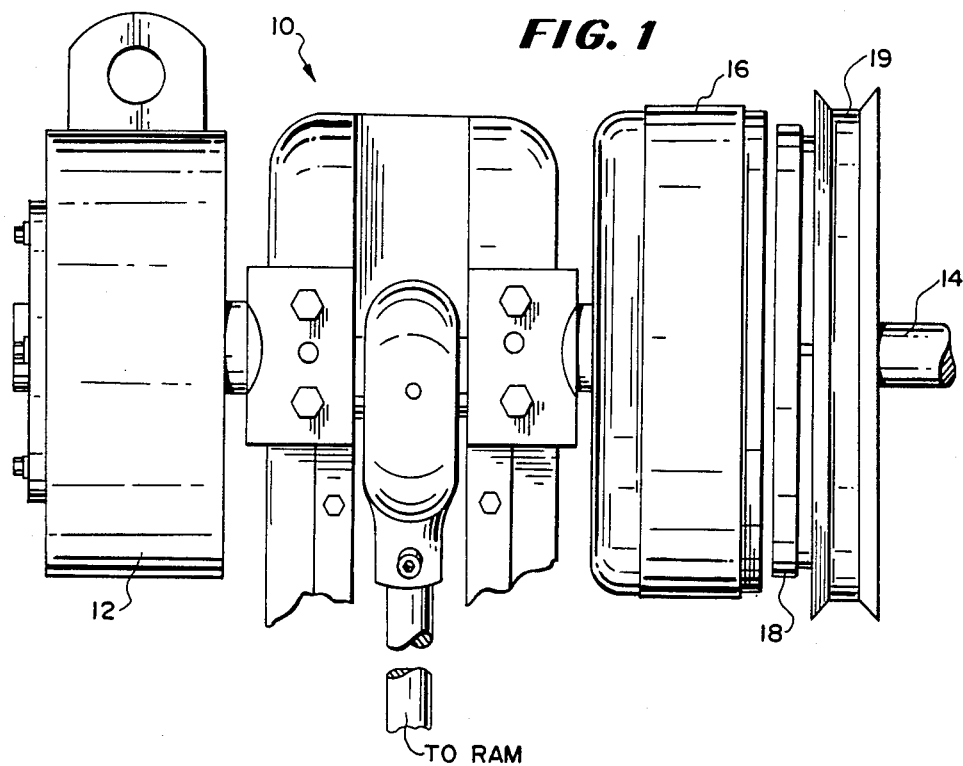
FIG. 1 is a front elevational view of a magnetic clutch and brake assembly used in a punch press.

Referring now to FIG. 1 in greater detail, there is illustrated therein a conventional electromagnetic brake and clutch assembly 10 forming part of a conventional punch press machine (not shown). Such machine can be of the type sold under the trade name M-38 Automatic Registration Pilot Hole Punch Press by Spartanics, Ltd. of Rolling Meadows, Ill. and includes an electromagnetic brake 12, a crankshaft 14, an electromagnetic clutch 16, a clutch coupling disc 18 and a flywheel 19.

The productivity of a punch press machine is greately influenced by the rotational speed at which it operates. This applies also to shearing machines and other single strokes cyclically operating machine tools and devices that utilize a mechanical pin clutch in combination with friction brakes where the cyclic rate is determined by the speed of rotation of the prime mover, the time delays incurred while a ram clutch pin engages a prime mover, and the time it takes to disengage the prime mover and stop the crankshaft.

With the advent of automatic machines using electro-optical single and dual axis registration and alignment systems, the speed of operation of the machine is then limited by the coupling, uncoupling and braking of moving parts of the machine. To quicken and facilitate rapid coupling, uncoupling and braking of moving parts of a machine, such as a punch press, the electromagnetic clutch 16 and electromagnetic brake 12 are coupled into a control circuit 20 (FIG. 2) constructed according to the teachings of the present invention.

Figure 2:
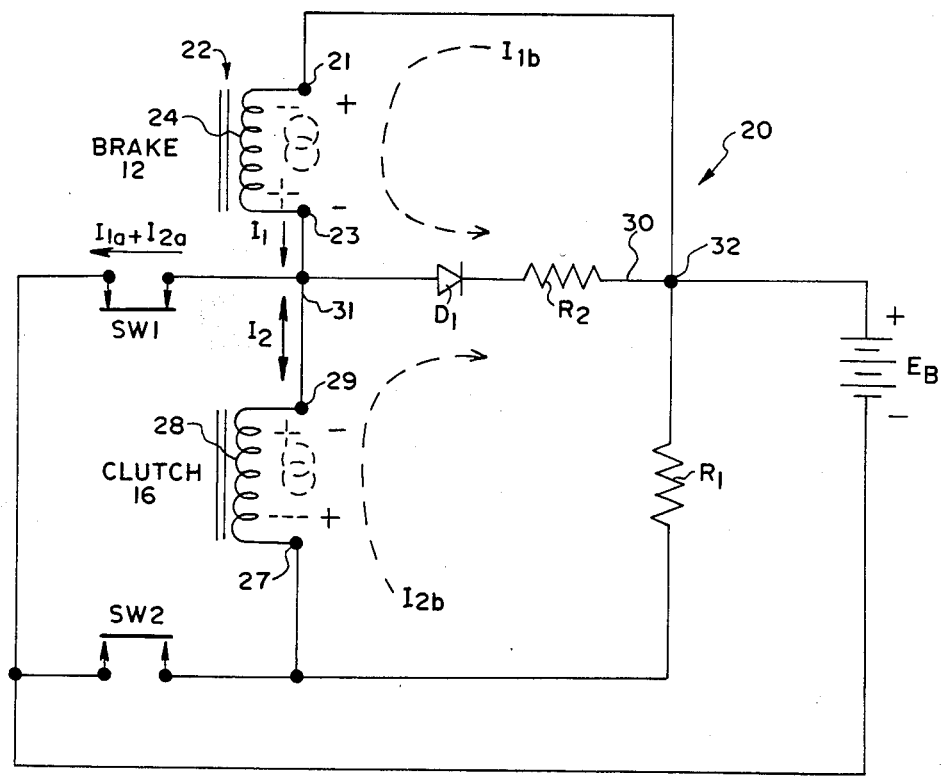
FIG. 2 is a simplified schematic circuit diagram of the electrical circuit of the apparatus of the present invention for operating the clutch and brake assembly shown in FIG. 1.

As shown in FIG. 2, the control circuit 20 includes a source of DC voltage $E_B$ having its positive (+) terminal connected to one end 21 of an inductance 22 which typically can be defined by a coil 24 of the electromagnetic brake 12. The other end 23 of the coil 24 is connected through a first, initially closed, switch SW1 to the negative (−) terminal of the DC power source $E_B$. This flow of current through the coil 24 energizes the brake to have a polarity, as shown with a solid + and −, that establishes a non-braking mode of operation of the brake 12. It will be apparent that when there is no current through the coil 24, the brake 12 is in a braking mode of operation.

Also as shown, the positive terminal of the power source is connected through a resistor $R_1$ to one end 27 of a coil 28 of the clutch 16, the other end 29 of which is connected to switch SW1 and end 23 of coil 24. When SW1 is closed, clutch 16 is energized to mechanically couple the crankshaft 14 to the rotating flywheel 19 through the clutch 16 and clutch coupling disc 18.

The time constants for energizing the coil inductances of coils 24 and 28 are essentially the same and are made as short as possible.

Switch SW1 is maintained energized for a time period sufficient to carry the press crankshaft 14 from its "home" position at top dead center (TDC) through 300° rotation. For this time period, currents $I_{1a}$ and $I_{2a}$ flow through the respective coils 24 and 28 and the sum of these currents flows through switch SW1.

At 300° or −60° from TDC, switch SW1 is opened and a switch SW2 is closed to connect the coils 24 and 28 in series with the voltage source $E_B$ as shown.

Upon the opening of switch SW1 and the closing of switch SW2, the magnetic fields of both of the coils 24 and 28 start to collapse generating large opposing voltages as shown by the phantom or dotted voltage polarity for the coils 24 and 28. Such voltages are defined by the equation $N_B(d\phi_B/dt)$ and $N_C(d\phi_C/dt)$ where $N_B$ equals the number of turns of the brake coil 24 and $N_C$ equals the number of turns of the clutch coil 28. For this analysis, the resistance of the brake inductance $L_B$ and clutch inductance $L_C$ are ignored.

When switch SW2 is closed, this in effect, places the voltage source or battery $E_B$ in series additive relationship to the generated brake coil voltage $N_B(d\phi_B/dt)$ to rapidly collapse and change the direction of the magnetic field of the clutch coil 28. The voltage across the brake coil 24 is then $(I_{1b}+I_{2b})R_2$ where $R_2$ is a resistor connected in series with a diode D1 in a branch 30 connected between a junction 31 (between the brake coil 24 and the clutch coil 28) and a junction 32 (between the resistor $R_1$ and the brake coil 24).

The voltage across the clutch coil 28 is $(I_{1b}+I_{2b})R_2+E_B$ and this causes a faster decay of the flux in the clutch coil 28.

When the decaying current $I_{2b}$ reaches zero, a new current $I_{2b}$ generated from $E_B+N_B d\phi_g/dt$ starts to build up in the direction to oppose the remnant magnetism in the clutch coil 28 with the rate being $L_C(dI_{2b}/dt)=L_B(dI_{1b}/dt)+E_B$ such that the still decaying current in the brake coil 24 is aiding in the buildup of a reverse, new current $I_{2b}$ through the clutch coil 28. At the instant $I_{1b}+I_{2b}=0$, the voltage across resistor $R_2$ becomes zero and the current $I_{1b}$ will then equal the new current $I_{2b}$.

At this time, the increase in $I_{2b}$ is determined by the equation $(L_B+L_C)dI_2/dt=E_B$.

The increasing current, current $I_{2b}$ which now equals current $I_{1b}$, maintains the brake coil 24 energized and the brake 12 non-operative while the rapid change of magnetic polarity of the clutch coil 28 repels the clutch coupling disc 18. This secondary effect, i.e. repelling of the coupling disc 18 which aids in speeding up the clutch release, is due to the magnetic poles of the clutch iron structure having rapidly changed polarity before the "sealed" coupling disc 18 residual magnetism has reversed, thus tending to push the coupling disc 18 away.

After coupling disc 18 of the clutch 16 separates from the clutch pole face, the second switch SW2 is de-energized to start the rapid collapse of the magnetic field in the clutch coil 28 so that the brake coil 24 is soon de-energized to apply the brake 12 to stop the rotation of the ram. In this way, the brake 12 is only activated (upon de-energization of brake coil 24) after the clutch is separated from the clutch pole face thereby never allowing both the clutch 16 and brake 12 to be activated at the same time. This interlock function prevents stalling of the prime mover.

Referring now to FIGS. 3 and 4, a preferred embodiment of the control circuit of the present invention is identified by reference numeral 34 in FIG. 3. Here the brake coil 24 and the clutch coil 28, are shown connected to terminal pins on a circuit board 40. More specifically, the coil 24 is connected to pins 41 and 42 on the circuit board 40 and the coil 28 is connected to pins 43 and 44 on the circuit board 40. As shown, the circuit board 40 includes further pins 45, 46 and 47, 48. Terminal pins 47 and 48 are connected respectively, to the plus and minus sides of the voltage source $E_B$ and terminal pin 41 is connected to the plus side of the voltage source $E_B$.

The terminal pin 45 is connected to press crankshaft logic circuitry 50 for operating the press crankshaft 14. The press crankshaft logic is coupled to system logic which can be in a micro-processor.

The terminal pin 46 is coupled to a press trip logic circuitry 52 which is adapted to send an output signal to the terminal pin 46 when it receives a short trip pulse (a) from the system logic.

In the operation of the control circuit 34 so far described and with reference to FIG. 4 a short trip pulse (a) from the system logic develops a pulse (b) in the press trip logic circuitry 52 whose length in time is determined to be long enough to engage the clutch 16 to operate the ram off top dead center (TDC) or some small rotational angle. This generates a signal from the system logic to the press ram cycle logic circuitry which outputs a pulse (c) which is a clutch hold-on pulse, the length of which is a function of the press parameters. Pulses (b) and (c) combine from the output side of terminal pins 45 and 46 through diodes D4 and D5 and a resistor $R_3$ to turn on a transistor 54 forming part of switch SW1. The combined pulses (b) plus (c) maintain switch SW1 closed (transistor 54 on). In other words, transistor 54 is turned on for the combined overlapping time length of the pulses (b) and (c) which start at different times and end at different times as shown in the graph of FIG. 4. Transistor 54, when turned on, couples junction 31 through a resistor $R_4$ to pin 48 and the negative terminal of the voltage source or battery $E_B$ to energize coils 24 and 28.

At the end of the second pulse (c), transistor 54 is turned off to open switch SW1. The negative going edge of the pulse (c) is supplied via conductors 56 and 58 to an input 59 of a monostable multivibrator or "one shot" 60 which then outputs a pulse (d) from its output 61 to the base of a transistor 62 forming part of the second switch SW2. This completes a circuit from the end 27 of the clutch coil through the terminal pin 43, to collector 63 of the transistor 62 and through transistor 62 and a resistor 64 of second switch SW2 to the negative side of the battery $E_B$.

As shown the combination of pulses (b) and (c) are clipped by a voltage clipping circuit 66 defined by resistor $R_3$ and a Zener diode $Z_1$ to provide a pulse with an exact voltage height as determined by Zener diode $Z_1$. This voltage is matched by voltage developed by $I_{1a}$ and $I_{2a}$ flowing through $R_4$ to provide a constant current, high impedance drive through switch SW1.

Likewise the pulse (d) from the output 61 of the one shot 60 is clipped by a voltage clipping circuit 68 defined by a resistor $R_5$ and a Zener diode $Z_2$ so that the voltage established by Zener diode $Z_2$ is matched by voltage developed by the current $I_{1b}$ and $I_{2b}$ flowing through resistor 64.

As shown in FIG. 4, switch SW2 will only be closed for a short time period equal to the width of pulse (d). This time period is sufficient to enable the clutch coupling disc to separate from the clutch pole face as described above.

From the foregoing description it will be apparent that the control circuit 20 or 34 of the present invention has a number of advantages, some of which have been described above, and others of which are inherent in the invention. Also it will be apparent that modifications can be made to the control circuit 20 or 34 without departing from the teachings of the present invention. Accordingly, the scope of the invention is only to be limited as necessitated by the accompanying claims.

We claim:

1. A method for operating a magnetic clutch and brake system of the type which includes a magnetic clutch having a clutch magnetizing coil which can be actuated to couple a first rotatable element to a second rotatable element when voltage is applied across the clutch magnetizing coil and which disengages the second rotatable member when voltage is disconnected from, or connected momentarily in the reverse polarity across, the clutch magnetizing coil, and a magnetic brake associated with the second rotatable element and having a brake magnetizing coil which is in a non-braking mode of operation when energized and which is in a braking mode of operation when de-energized, said method including the steps of:

providing a DC voltage source;

applying a voltage from said voltage source across the brake magnetizing coil for a first time period;

applying a voltage from said voltage source across the clutch magnetizing coil for the first time period with both of said coils being connected in parallel across said voltage source;

providing a unidirectional current path across said coils;

simultaneously and momentarily disconnecting the voltage source across both coils without causing an open circuit of either coil and thereby causing the coils to reverse polarity with the current generated in each coil flowing through said unidirectional current path;

reconnecting the voltage source across said clutch magnetizing coil and in series with the brake magnetizing coil but with said clutch magnetizing coil connected in reverse polarity to the first connection thereof across said voltage source and said voltage source connected across said brake magnetizing coil in the same polarity as it was when voltage was first applied across said brake magnetizing coil for a second time period thereby to accelerate a rapid change of magnetic polarity of the clutch magnetizing coil to repel a flywheel coupling disc of the magnetic clutch while maintaining the brake magnetizing coil energized; and after the second time period, again disconnecting the coils from said voltage source to allow said brake to be actuated to stop movement of said second element.

2. Apparatus for operating a magnetic clutch and brake system of the type which includes a magnetic clutch having a clutch magnetizing coil which can be actuated to couple a first rotatable element to a second rotatable element when voltage is applied across the clutch magnetizing coil and which disengages the second rotatable member when voltage is disconnected from, or connected in reverse polarity across, the clutch magnetizing coil and a magnetic brake associated with the second rotatable element and having a brake magnetizing coil which is in a non-braking mode of operation when the brake magnetizing coil is energized by applying a voltage across the coil and which is in a braking mode of operation when the brake magnetizing coil is de-energized, said apparatus including:

a DC voltage source;

first circuit means for coupling a voltage from said voltage source having a given polarity across said brake magnetizing coil for a first time period;

second circuit means for coupling a voltage from said voltage source having one polarity across said clutch magnetizing coil for the first time period with both of said coils being connected in parallel across said voltage source;

a unidirectional current path coupled across said coils;

first switch means for simultaneously and momentarily disconnecting the voltage source across both coils without causing an open circuit of either coil and thereby causing said coils to reverse polarity with the current generated in each coil flowing through said unidirectional current path;

second switch means for reconnecting said voltage source across said clutch magnetizing coil and in series with said brake magnetizing coil but with said clutch magnetizing coil connected in reverse polarity to the first connection thereof across said voltage source and said voltage source connected in the same polarity across said brake magnetizing coil as it was when said first switch was closed for a second time period thereby to accelerate a rapid change of magnetic polarity of said clutch magnetizing coil to repel a flywheel coupling disc of said magnetic clutch while maintaining said brake magnetizing coil energized; and means for operating said second switch means to disconnect said coils from said voltage source after the second time period to allow said brake to be actuated to stop movement of said second element.

3. A method for operating a magnetic clutch system of the type which includes a magnetic clutch having a clutch magnetizing coil which can be actuated to couple a first rotatable element to a second rotatable element when voltage is applied across the clutch magnetizing coil and which disengages the second rotatable member when voltage is disconnected from, or connected in reverse polarity across, the clutch magnetizing coil, said method including the steps of:
- providing a DC voltage source;
- applying a voltage from said voltage source across an inductor coil for a first time period;
- applying a voltage from said voltage source having one polarity across the clutch magnetizing coil for the first time period with both of said coils being connected in parallel across said voltage source;
- providing a unidirectional current path across said coils;
- simultaneously and momentarily disconnecting the voltage source across both coils without causing an open circuit of either coil and thereby causing the coils to reverse polarity with the current generated in each coil flowing through said unidirectional current path;
- reconnecting the voltage source across the clutch magnetizing coil and in series with the inductor coil but with said clutch magnetizing coil connected in reverse polarity to the first connection thereof across said voltage source and said voltage source connected in the same polarity across said inductor coil as it was when voltage was first applied across said inductor coil for a second time period thereby to accelerate a rapid change of magnetic polarity of the clutch magnetizing coil to repel a flywheel coupling disc of the magnetic clutch; and
- after the second time period, again disconnecting the coils from said voltage source.

4. Apparatus for operating a magnetic clutch system of the type which includes a magnetic clutch having a clutch magnetizing coil which can be actuated to couple a first rotatable element to a second rotatable element when voltage is applied across the clutch magnetizing coil and which disengages the second rotatable member when voltage is disconnected from, or momentarily connected in reverse polarity across, the clutch magnetizing coil, said apparatus including:
- a DC voltage source;
- an inductor coil;
- first circuit means for coupling a voltage from said voltage source having a given polarity across said inductor coil for a first time period;
- second circuit means for coupling a voltage from said voltage source having one polarity across said clutch magnetizing coil for the first time period with both of said coils being connected in parallel across said voltage source;
- a unidirectional current path across said coils;
- first switch means for simultaneously and momentarily disconnecting the voltage source across both coils without causing an open circuit for either coil and thereby causing said coils to reverse polarity with the current generated in each coil flowing through said unidirectional current path;
- second switch means for reconnecting said voltage source across said clutch magnetizing coil and in series with said inductor coil but with said clutch magnetizing coil connected in reverse polarity to the first connection thereof across said voltage source and said voltage source connected in the same polarity across said inductor coil as it was when said first switch was closed for a second time period thereby to accelerate a rapid change of magnetic polarity of said clutch magnetizing coil to repel a flywheel coupling disc of said magnetic clutch while maintaining said inductor coil energized; and
- means for operating said second switch means to disconnect said coils from said voltage source after the second time period.

5. The apparatus of claim 4 wherein said unidirectional current path includes a diode and a resistor.

6. The apparatus of claim 4 wherein said inductor comprises a brake magnetizing coil of a brake included in the system.

7. The apparatus according to claim 4 wherein said first switch means includes a transistor.

8. The apparatus of claim 4 wherein said second switch means includes a transistor.

9. The apparatus of claim 2 wherein said unidirectional current path includes a diode and a resistor.

10. The apparatus according to claim 9 wherein said first switch means includes a first transistor.

11. the apparatus according to claim 10 wherein said second switch means includes a transistor.

12. The apparatus according to claim 11 wherein said means for operating said second transistor is also operable to operate said first transistor and includes logic circuitry for operating the overall clutch and brake system, press ram cycle logic circuitry for controlling the time period a press ram is rotating once the clutch has been energized, press trip logic circuitry having an input coupled to the base of said first transistor for turning on said first transistor to maintain said first transistor turned on for a predetermined time period, said press ram cycle logic circuitry also being coupled to the base of said first transitor for maintaining said first transistor turned on for a time period which overlaps the time period generated by said press trip logic circuitry, and a monostable multivibrator having an input coupled to an output of said first transistor and an output coupled to the base of said second transistor and being operable on the turning off of said first transistor to generate an output pulse of a predetermined duration that is supplied to said second transistor for turning on said second transistor for a predetermined time period after which said second transistor is turned off.

* * * * *